W. ELMER.
Separating Metals.
No. 63,026. Patented Mar. 19, 1867.
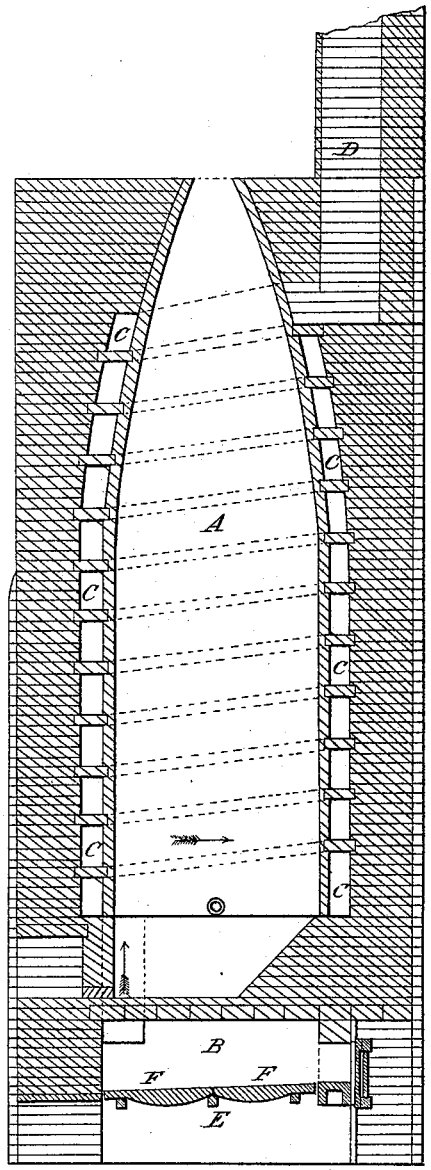
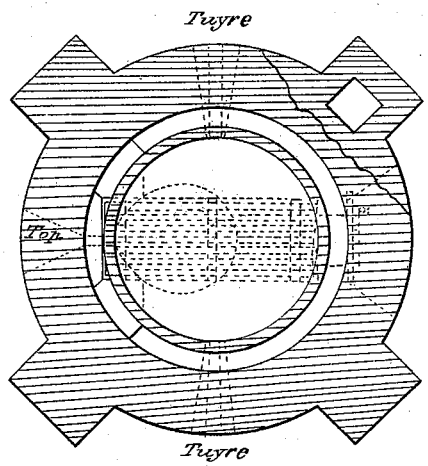
Witnesses:
Inventor:

United States Patent Office.

WILLIAM ELMER, OF NEW YORK, N. Y.

Letters Patent No. 63,026, dated March 19, 1867.

IMPROVED PROCESS OF SEPARATING METALS.

*The Schedule referred to in these Letters Patent and making part of the same.*

TO ALL WHOM IT MAY CONCERN:

Be it known that I, WILLIAM ELMER, of the city, county, and State of New York, have invented a new and useful Process of Separating Gold, Silver, and other Metals from their Ores, or from other matters containing them, and either for the purpose of assaying them or for the purpose of smelting them on a large scale, and that the following is a full, clear, and exact description of my invention, reference being had to the accompanying drawing, which represents a vertical central section and a horizontal section of a furnace suitable for practising my invention.

The object of my invention is principally to separate the metals from the ores with which they are found combined in nature, either for the purpose of assaying them (by which I mean ascertaining the respective quantities of metals contained in the ores) or for the purpose of obtaining the metals on a large scale for manufacturing or other purposes. To this end my invention comprises a complete process for treating the ores of the metals, consisting of certain operations, some of which being capable of use without others constitute subordinate processes, which form parts of my invention.

My complete process consists substantially of three operations, which are—

First. The oxidation of metallic ores by treating them while hot with a gaseous substance that supplies oxygen to them.

Second. The reduction of the oxides by treating the oxidized ores while hot with a gaseous substance that has a higher affinity for oxygen (while hot) than the metals whose oxides are to be reduced have, and which therefore eliminates their combined oxygen.

Third. The fusion of the metals by treating the reduced ores while hot with a gaseous substance, which from its higher affinity for oxygen than the metals to be reduced is incapable of oxidizing them.

Which three operations, when performed successively in the above order upon the material to be treated, constitute one entire process.

My invention consists further of the process composed of two operations, which are—

First. The reduction of metallic oxides by treating them (either when in the form of ores or when separated from earthy matter) while hot with a gaseous substance that (while hot) has a higher affinity for oxygen than the metals to be reduced have, and which therefore eliminates the combined oxygen from them.

Second. The fusion of the reduced oxides (whether mixed with earthy matter or not) by treating them while hot with a gaseous substance that from its higher affinity for oxygen than the metals to be reduced is incapable of oxidizing them.

These two operations, when performed successively in the above order, constitute one entire process.

My invention consists further of the process of separating the metals from each other by treating their mixtures (whether combined with earthy matter or not) at progressively increased temperatures with a gaseous substance that has a higher affinity for oxygen than the metals, so that the metals are fused in a non-oxidizing atmosphere in the order of their respective fusing temperatures and may be withdrawn seriatim from the mass under treatment.

My invention may be conveniently practised in a furnace such as is represented in the accompanying drawing. This furnace has a chamber, A, for the materials to be treated; a fire-box, B, for the production of heat by burning fuel; a helical flue, C, surrounding the chamber A, for heating the chamber by the products of combustion; and a chimney, D. The fire-box is provided with the customary appurtenances, such as ash-pit E, grate-bars F, fire-door, and ash-pit door; and the combustion of fuel in it may be excited either by the draught produced by a high chimney or by a fan or cylinder blast, or by both means. The chimney should be provided with a damper to regulate the draught, and, if a blast be used, the blast pipe should be provided with a valve or register to regulate its intensity, so that the operator may have the heat of the furnace under control. The height of the chamber A should not be less than four times its diameter, but this proportion may be varied as found expedient. It should be constructed of refractory materials, such, for example, as the best fire-bricks, or of bricks made of the material used in manufacturing black-lead crucibles. At its bottom a tapping hole, m, is provided to let out the liquid matter, and the upper surface of the bottom should be inclined toward this tapping hole. The lower portion of the chamber, which may be termed the crucible, is perforated to admit tuyeres, n, by which the gaseous materials are introduced; and these tuyeres should be formed of very refractory material. The crucible of the furnace should also be coated with enamel of vitrified earthy matter, but as such enamelling, is produced by the smelting of the first charge of ore, the application of an enamel before the furnace is first used is not a matter of necessity.

I prefer to reduce the ores to be treated to the condition of powder, which may be done by the mechanical appliances in common use for the purpose, such as stamps, and crushing and grinding-mills of various constructions. The gaseous substance which I prefer to employ for the oxidation of the metals is atmospheric air, which contains oxygen in mixture with other gases which do not practically change its action upon metallic substances, so that the oxygen is practically as free to combine with the metals as if it were used unmixed with the other gases. The gaseous substance which I prefer to employ for the reduction of the metallic oxides to the metallic state is the mixture of hydrogen and carbonic oxide obtained by the action of incandescent carbon upon highly heated steam; and I prefer to obtain this mixture by causing steam previously heated to a temperature of about 2000° Fahrenheit to flow into a retort containing charcoal or anthracite coal heated to a white heat. The gaseous substance which I prefer to use for the ultimate fusion of the more refractory metals is a mixture of hydrogen and oxygen obtained from the decomposition of water, and it may be used without danger of explosion if it be mixed previous to being burned with an equal volume of the mixture of hydrogen and carbonic oxide, obtained, as above described, from the action of incandescent carbon upon highly heated steam. The mixture of the gases (hydrogen and oxygen) may be obtained by the decomposition of the water in any of the ways known to chemists for the purpose of obtaining the mixture, or the mixture may be obtained by producing the two gases (hydrogen and oxygen) separately and then mixing them.

The gases for reduction and fusion should be stored for use in gas-holders similar to those used for holding illuminating gas, and suitable pipes, fitted with valves or stop-cocks, should be provided to conduct them to the tuyeres of the furnace. The atmospheric air may be forced into the tuyeres by means of a blowing engine, and the other gases may be forced in by the same apparatus if the pressure obtained by weighing the floating chamber of the gas-holder be insufficient for the purpose.

When the gases have been prepared the complete process may be successfully practised in the following manner, supposing gold or silver-bearing quartz to be the material to be operated upon: The bottom of the furnace chamber should be covered to a depth of about six inches with quick-lime in fragments (sifted clear of powder) so as to form a species of drain for the fluid metals to the tapping hole; and the material, previously reduced to a fine powder, should be charged into the chamber. The furnace is brought to a red heat by burning fuel in the fire-chamber; then atmospheric air is forced into the tuyeres, and the heat is progressively raised. The effect of this operation is to drive off the more volatile substances, such as the sulphur and arsenic, to burn out such carbonaceous matter, or other matter, as is capable of combustion at a red heat, and to oxidize such metals as are capable of oxidization under such circumstances. When the oxidation is completed (which can be determined for each kind of ore by practice) the air is shut off from the chamber; and the second operation is performed by causing the reducing gaseous substance to pass into the chamber through the tuyeres. The effect of this operation is to raise the temperature of the ore under treatment, while the hydrogen combines with the oxygen of the metallic oxides to form the vapor of water, and the carbonic oxide takes up another equivalent of oxygen and is converted into carbonic acid gas. Moreover, as the temperature is progressively raised those metals which are present in the ore and are fusible at the temperature without volatilizing, melt in the order of their fusing points, descend to the bottom of the chamber, and are permitted to flow out at the tapping hole. When the reduction is completed, which can be determined for each kind of ore by practice, the flow of the reducing gaseous substance is stopped, and the mixture of hydrogen and oxygen is supplied through the tuyeres. The flame produced by the burning of this mixture produces an intense heat, which raises the temperature of the ore under treatment without supplying oxygen to the metals, as that gas combines by preference with the hydrogen to form the vapor of water, which, passing upward, escapes at the upper end of the chamber. As the heat is thus progressively raised, such of the metals that are present as are volatilized by the heat pass off at the top of the chamber and may be collected in condensing chambers, to which the fumes may be conducted by pipes, while such of the metals as melt without practical volatilization are melted progressively in the order of their fusing points, and, descending to the bottom and percolating through the lime, flow from the tapping hole, so that each metal may be collected by itself almost unsoiled with others. Lastly, the silicious matter, which is fused by the intense heat, is permitted to flow from the tapping hole, leaving the chamber empty for a succeeding charge of material. In case the first of my subordinate processes is to be practised the two operations composing it may be conducted as above described, and the materials to be operated upon may be those which contain native oxides, or oxides which may have been formed by roasting the ores in the open air or in the usual roasting furnaces employed in metallurgical operations. In case the second of my subordinate processes is to be practised, it may be conducted, as above described, upon materials containing the metals to be separated in a suitable condition for fusing.

From the foregoing description it will be perceived that in my processes the heating, oxidation, reduction, and fusion of the metals are effected without mingling fuel with the material to be treated, and this is one of the fundamental features of my invention; but it is evident that my invention may be practised upon materials which contain fuel in some form mixed with them for the purpose of accomplishing a part of the desired result effected by the gaseous substances that are supplied to the chamber, or for other purposes, because so long as any portion of the desired result is accomplished by treating the material while hot with the gaseous substances, as above described, my invention is used for that portion.

Having thus described my invention, and the best mode of practising it which I have thus far devised, I declare that I do not restrict it to the use of a particular furnace, or other means used, nor to the mode of preparing the gaseous substances employed, nor to the particular gaseous substances I have described; all that is essential being that the gaseous substances used shall have those properties of the gaseous substances described, which are useful for the purpose to be accomplished, or, in other words, shall be the substantial equivalents of those described for the said purposes.

What I claim as my invention, and desire to secure by Letters Patent, is—

The process of treating metallic ores, or other materials containing metals, by the following three operations performed successively upon them, viz:

First. The oxidation of the oxidizable substances by treating the material while hot with a gaseous substance that supplies oxygen to them.

Second. The reduction of the oxides by treating the oxidized ores while hot with a gaseous substance that has a higher affinity for oxygen than the metals whose oxides are to be reduced.

Third. The fusion of the metals by treating the reduced ores while hot with a gaseous substance that is incapable of oxidizing them.

These three operations being performed in the order and substantially as hereinbefore set forth.

I also claim the process of treating metallic ores, or other materials containing metals, by the following two operations performed successively upon them, viz:

First. The reduction of the metallic oxides by treating the material while hot with a gaseous substance that has a higher affinity for oxygen than the metals to be reduced have.

Second. The fusion of the metals by treating the reduced ores while hot with a gaseous substance that is incapable of oxidizing them.

These two operations being performed in the order and substantially as hereinbefore set forth.

I also claim the process of separating the metals from each other by treating their mixtures at progressively increased temperatures with a gaseous substance that has a higher affinity for oxygen than the metals have, so that the metals are fused in a non-oxidizing atmosphere in the order of their fusing temperatures, the process being conducted substantially as hereinbefore set forth.

In testimony whereof I have hereunto set my hand this   day of April, A. D. 1866.

WILLIAM ELMER.

Witnesses:
WM. A. ELMER,
WM. C. TURNBULL.